US012366908B2

(12) United States Patent
Chen et al.

(10) Patent No.: US 12,366,908 B2
(45) Date of Patent: Jul. 22, 2025

(54) ENERGY AWARE DATA REPLICATION

(71) Applicant: Red Hat, Inc., Raleigh, NC (US)

(72) Inventors: Huamin Chen, Westford, MA (US);
Chen Wang, Chappaqua, NY (US);
Yehuda Sadeh-Weinraub, Los Angeles, CA (US)

(73) Assignee: Red Hat, Inc., Raleigh, NC (US)

( * ) Notice: Subject to any disclaimer, the term of this patent is extended or adjusted under 35 U.S.C. 154(b) by 556 days.

(21) Appl. No.: 17/747,890

(22) Filed: May 18, 2022

(65) Prior Publication Data

US 2023/0376101 A1    Nov. 23, 2023

(51) Int. Cl.
*G06F 1/3206*      (2019.01)
*G06F 1/28*      (2006.01)

(52) U.S. Cl.
CPC .............. *G06F 1/3206* (2013.01); *G06F 1/28* (2013.01); *G06F 2212/1028* (2013.01)

(58) Field of Classification Search
CPC ... G06F 1/3206; G06F 1/28; G06F 2212/1028
See application file for complete search history.

(56) References Cited

U.S. PATENT DOCUMENTS

| | | | | |
|---|---|---|---|---|
| 8,332,678 B1 * | 12/2012 | Mahalingam | ......... | G06F 1/3212 713/340 |
| 8,958,854 B1 * | 2/2015 | Morley | ............. | H04M 1/72448 712/15 |
| 2006/0223500 A1 * | 10/2006 | Osugi | ...................... | G07C 9/28 455/411 |
| 2010/0228819 A1 | 9/2010 | Wei | | |
| 2012/0281561 A1 * | 11/2012 | Shukla | .................. | H04W 76/38 370/252 |
| 2016/0157784 A1 * | 6/2016 | Suzuki | ................ | A61B 5/0022 600/300 |
| 2016/0173125 A1 * | 6/2016 | Yang | ................... | H03M 7/6082 707/693 |
| 2017/0124350 A1 * | 5/2017 | Reihman | ................ | A61B 5/746 |
| 2018/0145527 A1 * | 5/2018 | Ravi | .................. | G01R 31/3842 |

OTHER PUBLICATIONS

Lin et al., "EAFR: An Energy-Efficient Adaptive File Replication System in Data-Intensive Clusters", Department of Electrical and Computer Engineering, Clemson University, 2015, 8 pages.
Bhalaji, "Efficient and Secure Data Utilization in Mobile Edge Computing by Data Replication", Journal of ISMAC, vol. 02, No. 01, 2020, 12 Pages.
Jiang et al., "Energy aware edge computing: A survey", Computer Communications 151, Hangzhou Dianzi University, China, 2020, pp. 556-580.

(Continued)

*Primary Examiner* — Gary Collins
(74) *Attorney, Agent, or Firm* — Dority & Manning, P.A.

(57) ABSTRACT

It is determined that data stored on a storage device associated with a computing device powered by a power source is to be transmitted to a remote computing device. A power state of the power source is determined. An encoding mechanism is selected from a plurality of different encoding mechanisms based on the power state of the power source. The data is encoded based on the encoding mechanism to generate encoded data. The encoded data is transmitted to the remote computing device.

17 Claims, 5 Drawing Sheets

(56) References Cited

OTHER PUBLICATIONS

Vales et al., "Energy-aware and adaptive fog storage mechanism with data replication ruled by spatio-temporal content popularity", Journal of Network and Computer Applications 135, Portugal, 2019, pp. 84-96.
Li et al., "Energy-efficient fault-tolerant replica management policy with deadline budget constraints in edge-cloud environment", Journal of Network and Computer Applications 143, China, 2019, pp. 152-166.
Shao et al., "Replica selection and placement techniques on the IoT and edge computing: a deep study", Wireless Networks, Springer Nature, 2021, 17 pages.

* cited by examiner

ENERGY AWARE DATA REPLICATION

BACKGROUND

It is desirable to replicate data that is maintained on one device to another device for various purposes, including, for example, to back up the data to a more permanent storage location, and/or to provide access to the data to other devices for data consumption or further processing.

SUMMARY

The examples disclosed herein take into account a real-time power state of a device prior to initiating a replication process, and select a replication process from a plurality of different replication processes based on such power state to balance a particular level of replication robustness and an actual power state of a device.

In one example a method is provided. The method includes determining, by a computing device comprising a processor device and powered by a power source, that data stored on a storage device associated with the computing device is to be transmitted to a remote computing device. The method further includes determining, by the computing device, a power state of the power source. The method further includes selecting, by the computing device, a first encoding mechanism from a plurality of different encoding mechanisms based on the power state of the power source. The method further includes encoding, by the computing device, the data based on the first encoding mechanism to generate encoded data, and transmitting, by the computing device to the remote computing device, the encoded data.

In another example a computing device is provided. The computing device includes a wireless transceiver, a memory, and a processor device coupled to the memory to determine that data stored on a storage device associated with the computing device is to be transmitted to a remote computing device. The processor device is further to determine a power state of a power source that powers the computing device. The processor device is further to select a first encoding mechanism from a plurality of different encoding mechanisms based on the power state of the power source. The processor device is further to encode the data based on the first encoding mechanism to generate encoded data. The processor device is further to transmit, via the wireless transceiver, the encoded data to the remote computing device.

In another example a non-transitory computer-readable storage medium is provided. The non-transitory computer-readable storage medium includes executable instructions to cause a processor device to determine that data stored on a storage device associated with a computing device is to be transmitted to a remote computing device. The instructions further cause the processor device to determine a power state of a power source that powers the computing device. The instructions further cause the processor device to select a first encoding mechanism from a plurality of different encoding mechanisms based on the power state of the power source. The instructions further cause the processor device to encode the data based on the first encoding mechanism to generate encoded data. The instructions further cause the processor device to transmit the encoded data to the remote computing device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
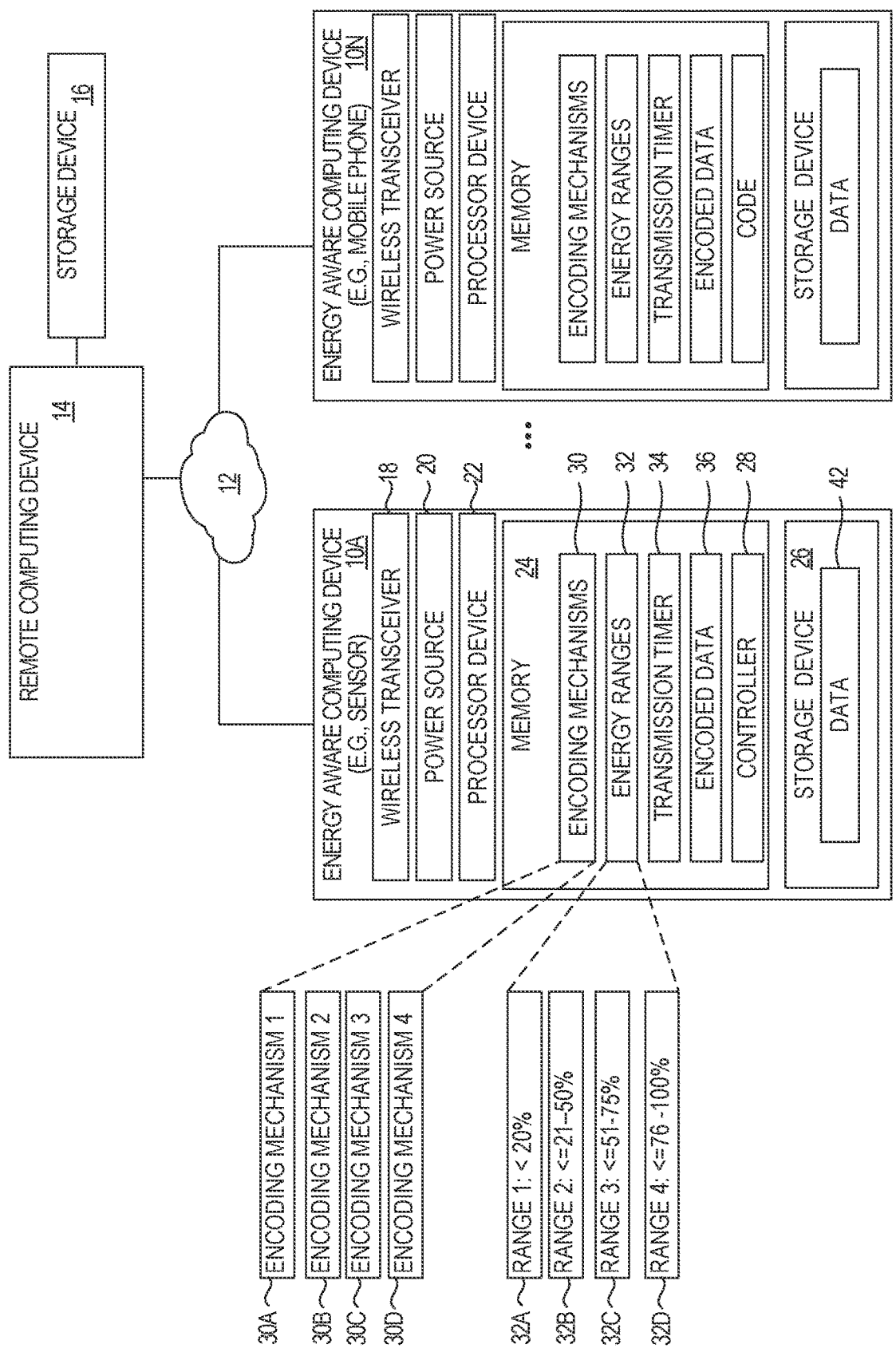
FIG. 1 is a block diagram of an environment in which an energy aware computing device may be deployed according to one example.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

By way of a non-limiting example, in an edge computing environment, data collection takes place on computing devices at the edge of a computing network, and further processing takes place on other devices such as computer servers. Edge devices need to collect and transmit their data to the servers. For one practical example, in a manufacturing operation where steps in the manufacturing process occur in various physical locations, edge computing devices may be strategically located throughout the manufacturing plants to report status information like throughput and time spent at each stage of the process. Such edge computing devices often need to replicate their collected data at various times through a wireless network to one or more servers which process all the data received from the edge computing devices. These servers may then further process the data from the edge devices to determine the overall efficiency of the manufacturing process and pinpoint areas of concern within each process step. Other practical examples include utilizing edge computing devices in smart city applications where the edge computing devices measure environmental, multimedia, telemetry data and any combination thereto. Such data may be replicated via wireless networks for subsequent data consumption and processing.

Edge computing devices that perform data collection are often not connected to a constant power source such as an electric grid, and instead may be coupled to a less reliable power source, such as a battery or a solar cell. Nevertheless, it is desirable to replicate the data maintained by such devices to other devices securely and efficiently, often through wireless networks. However, the replication process itself utilizes energy, and it may be desirable to take into account the real-time energy reserves of an edge device when performing data replication.

The examples disclosed herein take into account a real-time power state of a device prior to initiating a replication process, and select a replication process from a plurality of different replication processes based on such power state to balance a particular level of replication robustness and an actual power state of a device.

FIG. 1 is a block diagram of an environment in which an energy aware computing device may be deployed according to one example. FIG. 1 includes a plurality of energy aware computing devices 10A . . . 10N, each of which may communicate using one or more wireless communication protocols including, by way of non-limiting example, past, current and future versions of Bluetooth, Bluetooth LE, IEEE 802.11, cellular protocols including 4G, 5G, and 6G over a network 12 to a remote computing device 14. The network 12 may include various devices including base stations, routers, servers, and the like but are not shown here for simplicity. The remote computing device 14 includes a storage device 16 and may, without limitation, be a server computing device, a laptop computing device, a desktop computing device, a mobile handset computing device, or any other computing device that includes a processor device.

The energy aware computing device 10A includes a wireless transceiver 18, a power source 20, a processor device 22, a memory 24, and a storage device 26. The power source 20 may comprise, by way of non-limiting example, a battery or a solar cell coupled to a capacitor. The memory 24 includes a controller 28, a plurality of encoding mechanisms 30A-30D (generally, encoding mechanisms 30), a plurality of energy ranges 32A-32D (generally, energy ranges 32), a transmission timer 34, and encoded data 36.

The processor device 22 executes the controller 28 to monitor the power state of the power source 20. When it is time to replicate data from the energy aware computing device 10A, the controller 28 selects one of the plurality of encoding mechanisms 30 based on the current power state of the power source 20. The controller 28 may monitor the power state of the power source 20 via the receipt notifications from an operating system of the energy aware computing device 10A, by issuing calls to the operating system, or via any other mechanism via which the controller 28 can determine the current power state of the power source 20. In some implementations, the wireless transceiver 18 contains a processor device, and in such implementations, the controller 28 may, at least in part, execute on the wireless transceiver 18. The power state may be quantified in any desired manner, such as by voltage, amperage, remaining life, or the like.

The energy ranges 32A-32D correspond, respectively, with the encoding mechanisms 30A-30D. Thus, the energy range 32A corresponds with the encoding mechanism 30A, the energy range 32B corresponds with the encoding mechanism 30B, the energy range 32C corresponds with the encoding mechanism 30C, and the energy range 32D corresponds with the encoding mechanism 30D. Each encoding mechanism 30A-30D implements at least a compression technique or mechanism, an encryption technique or mechanism, or both a compression and encryption technique or mechanism that achieves a balance of energy consumption for executing such technique and a level of security based on the power state of the power source 20. Note that the term "power state" as used herein in the example reflects an amount of energy remaining in the power source 20; however, in other implementations, the power state may be quantified in other desired manner, such as voltage, amperage, or any other suitable metric. The energy range 32A and its associated encoding mechanism 30A may be selected when the remaining energy of the power source 20 is less than 20 percent of the power source 20 when fully charged. The energy range 32B and its associated encoding mechanism 30B may be selected when the remaining energy of the power source 20 is greater than 20 percent of the power source 20 and less than 50 percent of the power source 20 when fully charged. The energy range 32C and its associated encoding mechanism 30C may be selected when the remaining energy of the power source 20 is greater than 50 percent of the power source 20 and less than 75 percent of the power source 20 when fully charged. The energy range 32D and its associated encoding mechanism 30D may be selected when the remaining energy of the power source 20 is greater than 75 percent of the power source 20 and less than 100 percent of the power source 20 when fully charged.

When there is more energy remaining in the power source 20, the energy aware computing device 10A can utilize the more energy consuming encoding mechanisms 30C or 30D to achieve higher levels of security and error correction when transmitting its data wirelessly during replication. This condition can occur when the power state of the power source 20 is operating in the energy ranges 32C or 32D, respectively, for example.

When there is less energy remaining in the power source 20, the energy aware computing device 10A can utilize the less energy consuming encoding mechanism 30A to transmit data wirelessly during replication. In other words, the encoding mechanisms 30 that utilize less energy can be selected in accordance with the energy ranges 32 as the energy of the power source 20 decreases.

For example, relatively greater energy-intensive encryption techniques, such as, by way of non-limiting example, RC4 and Serpent, may be included in the encoding mechanisms 30C and 30D. Relatively lower energy-intensive encryption techniques, such as AES and Camelia, may be included in the encoding mechanisms 30A and 30B. When the power state of power source 20 is above 76%, the controller 28 may select the Serpent encryption technique embodied in the encoding mechanism 30D associated with the energy range 32D. When the power state of the power source 20 is less than 20%, the controller 28 may select the AES encryption technique embodied in the encoding mechanism 30A associated with the energy range 32A.

It is noted that there are many different encoding and encryption techniques with varying energy consumption, security protection, and error correction profiles. Based on such profiles, the different encoding techniques can be assigned, according to their known profiles, to the encoding mechanisms 30A-30D and can be associated with the corresponding energy ranges 32A-32D.

It is further noted that the energy ranges 32 are merely examples, and specific energy ranges can vary based on the type of the power source 20. In some implementations, the controller 28 tracks the historical power consumption associated with utilizing the encoding mechanisms 30A-30D at the different energy ranges 32A-32D, and based on the historical power consumption, may modify the one or more of the energy ranges 32A-32D associated with the encoding mechanisms 30A-30D.

For example, the controller 28 may monitor the encoding mechanism 30D and determine that the encoding mechanism 30D is operating efficiently due to environmental conditions or other workload being run on the processor device 22 such that the encoding mechanism 30D may be used when the power source 20 is in the energy range 32C. In this way, the energy aware computing device 10A may achieve a higher level of security and/or compression than initially identified in the energy ranges 32.

In another example, the controller 28 may modify the ranges of the energy ranges 32A-32D based on the historical power consumption associated with the corresponding encoding mechanisms 30A-30D. In particular, the controller 28 can modify the energy range 32A to be <=10%, and the energy range 32B to be in the range of greater than 10% and less than 50%. In this way, the selection of encoding mechanisms 38 will be more finely tuned to the current environmental conditions that are causing the encoding mechanisms 30 to operate more efficiently. It should be understood that there are numerous combinations for ranges of the energy ranges 32A-32D. It is further noted that the energy aware computing device 10A may utilize more or fewer than four energy ranges 32 and encoding mechanisms 30 as depicted in FIG. 1.

In some implementations, the transmission timer 34, upon expiration, triggers the controller 28 to determine whether there is data to be transmitted to the remote computing device 14. The controller 28 determines the power state of the power source 20. The controller 28 uses the power state to determine in which energy range 32A-32D the power source 20 is currently operating and selects the corresponding encoding mechanism 30A-30D to use while replicating data. The controller 28 encodes data 42 based on the selected encoding mechanism 30 to form the encoded data 36. The wireless transceiver 18 transmits the encoded data 36 to the remote computing device 14. Additional triggers other than the transmission timer 34 will be discussed in connection with FIG. 3.

It is noted that, because the controller 28 is a component of the energy aware computing device 10A, functionality implemented by the controller 28 may be attributed to the energy aware computing device 10A generally. Moreover, in examples where the controller 28 comprises software instructions that program the processor device 22 to carry out functionality discussed herein, functionality implemented by the controller 28 may be attributed herein to the processor device 22.

Figure 2:
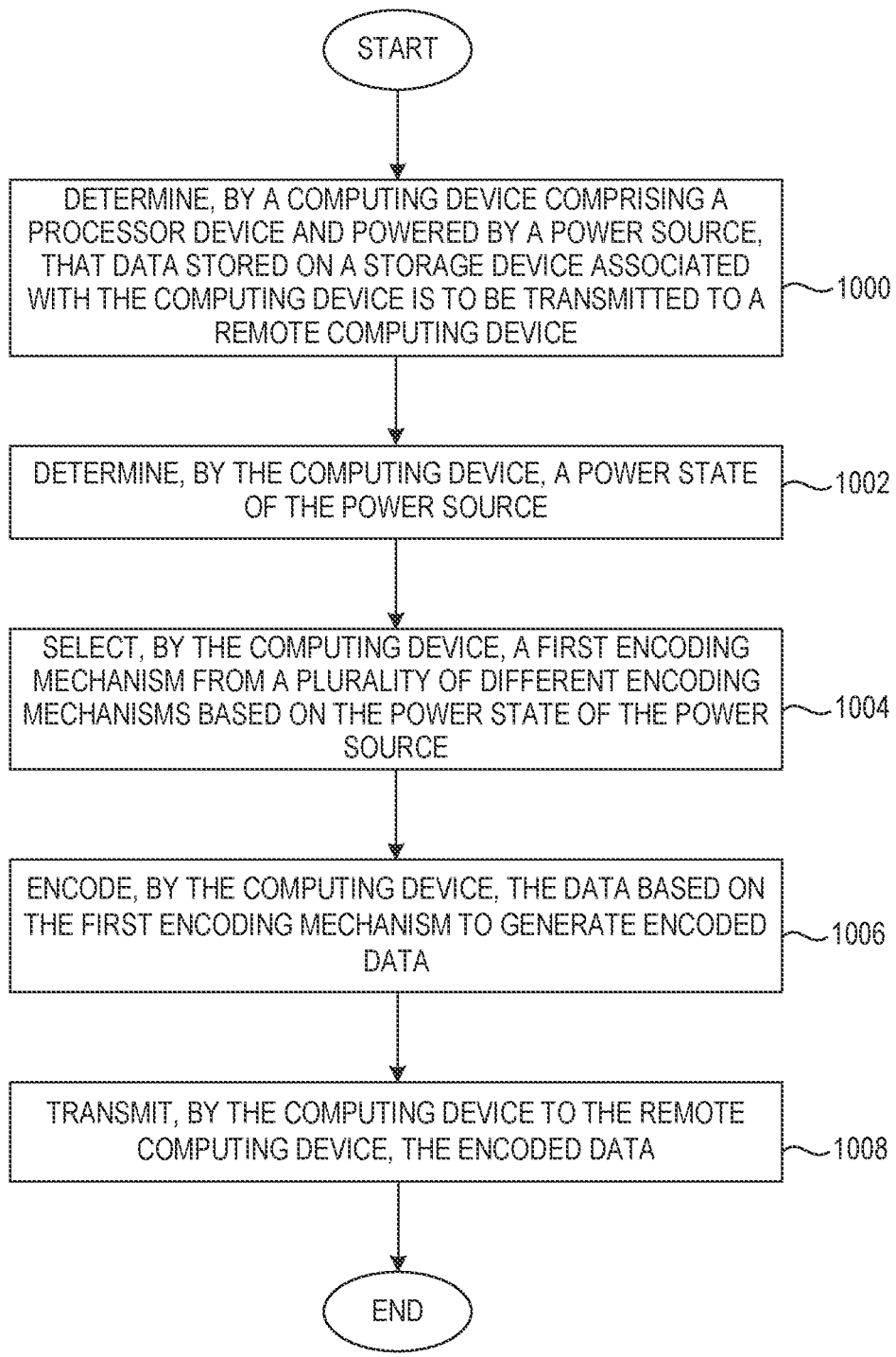
FIG. 2 is a flowchart of a method for an energy aware computing device to replicate data according to one example.

FIG. 2 is a flowchart of a method for the energy aware data replication according to one example. FIG. 2 will be discussed in conjunction with FIG. 1. The computing device 10A determines that the data 42 stored on the storage device 26 associated with the computing device 10A is to be transmitted to the remote computing device 14 (FIG. 2, block 1000). The computing device 10A determines a power state of the power source 20 (FIG. 2, block 1002). The computing device 10A selects a first encoding mechanism 30 from a plurality of different encoding mechanisms 30 based on the power state of power source 20 (FIG. 2, block 1004). The computing device 10A encodes the data 42 based on the first encoding mechanism 30 to generate the encoded data 36 (FIG. 2, block 1006). The computing device 10A transmits, to the remote computing device 14, the encoded data 36 (FIG. 2, block 1008).

Figure 3:
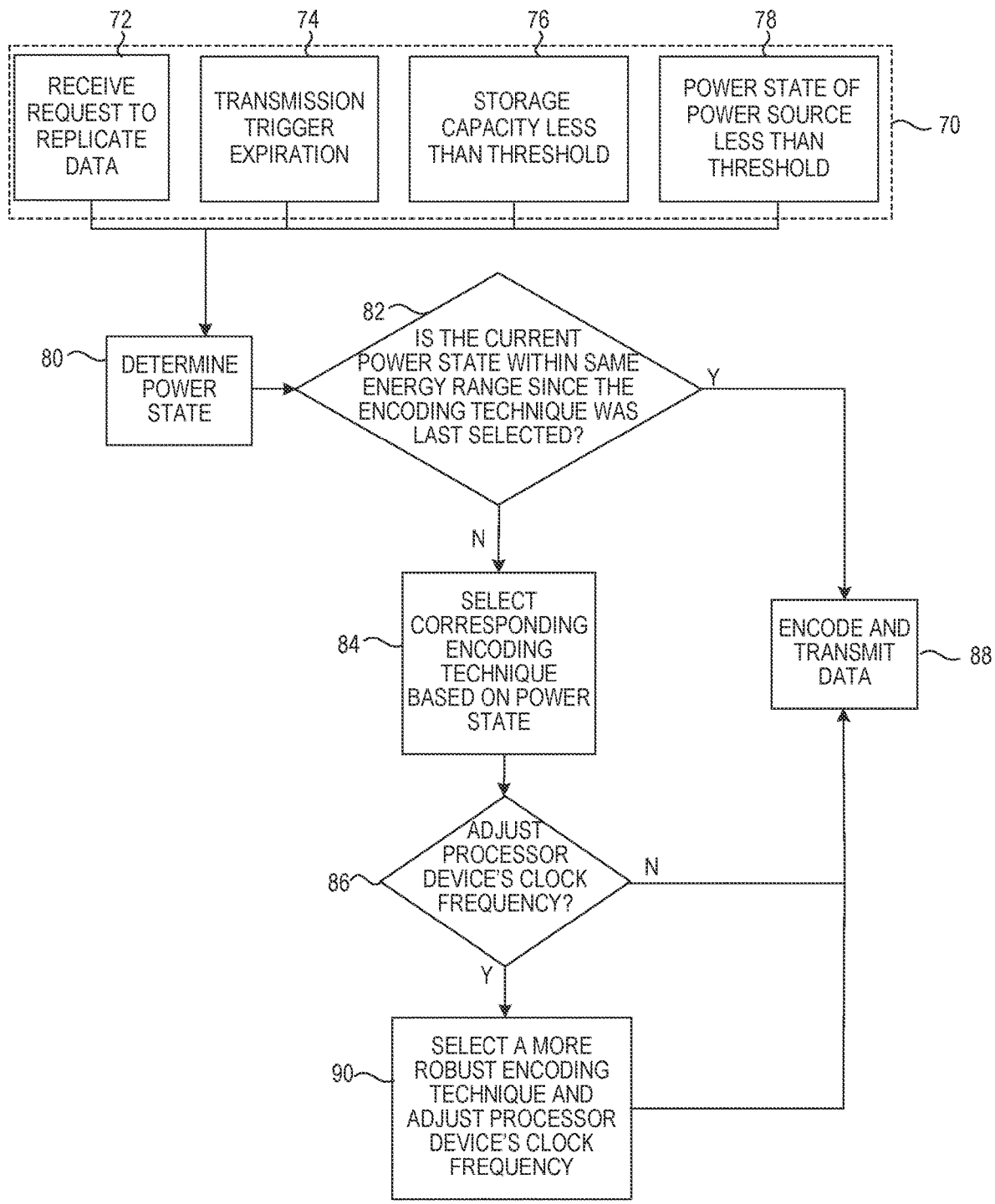
FIG. 3 is a flowchart of a method further refining the flowchart of FIG. 2 according to one example.

FIG. 3 is a flowchart of a method for energy aware data replication according to another example. FIG. 3 will be discussed in conjunction with FIGS. 1 and 2. Determinations 70 identify a plurality of mechanisms via which the energy aware computing device 10A may determine that the data 42 is to be transmitted to the remote computing device 14. At step 72, the energy aware computing device 10A may receive a request over the network 12 to replicate the data 42 from the remote computing device 14. Alternatively, at step 74, the transmission timer 34 may expire and trigger the energy aware computing device 10A to replicate the data 42. In some implementations, the controller 28 may increase or decrease the transmission timer 34 based on the power state of the power source 20. For example, if the power state is relatively high, the controller 28 may decrease the transmission timer 34 such that the data 42 is replicated more often, and if the power state is relatively low, the controller 28 may increase the transmission timer 34 such that the data 42 is replicated less often.

Alternatively, at step 76, the controller 28 may determine that the remaining storage capacity of the storage device 26 is less than a predefined data capacity threshold. As a result, the energy aware computing device 10A transmits the data 42 to the remote computing device 14 to increase the remaining storage capacity of the storage device 26. Alternatively, at step 78, the controller 28 determines that the power state of the power source 20 is less than a predefined threshold, and thus the data 42 may not be replicated at this time.

Steps 76 and 78 may be implemented either by the controller 28 obtaining information via which the controller 28 can make the determinations 70, or via notifications from the operating system that the identified conditions exist.

Once the energy aware computing device 10A has determined that the data 42 is to be transmitted to the remote computing device 14, the controller 28 executes steps 80, 82, 84, 86, 88, and 90. At step 80, the controller 28 determines the power state of the power source 20. Proceeding to step 82, the controller 28 determines if the current power state of the power source 20 is within the same energy range 32 since the encoding mechanism 30 was last selected. If so, step 82 proceeds to step 88 which encodes the data 42 based on the current selected encoding mechanism 30. If the power state of the power source 20 is in a different energy range 32 than the last time an encoding mechanism 30 was selected, step 82 proceeds to step 84.

At step 84, the controller 28 determines the energy range 32 in which the power source 20 currently exists, and selects the encoding mechanism 30 that corresponds to such energy range 32. In another example, step 84 may also monitor the channel quality and signal strength of a cellular signal needed to transmit data wirelessly and select a different encoding mechanism 30 than the one associated with the energy range 32 in which the power source 20 is currently operating. In this example, the energy aware computing device 10A may have a strong cellular signal such that transmitting data will not expend as much energy as using a weaker channel. As such, it is possible for a more energy consuming encoding mechanism 30 to be used to achieve a higher security level despite the current power state of the power source 20. This example occurs when the energy saved to transmit data over a strong wireless channel can be traded off with the energy expended on the encoding mechanism 30.

At step 86, the controller 28 determines whether any fine energy adjustments are to be made to the selection of the encoding mechanism 30 by adjusting the clock frequency at which the processor device 22 operates. The controller 28 may determine if enough energy can be saved by running a more robust, but less energy efficient, encoding mechanism 30 to alter the selection in step 84. If there are sufficient energy savings, step 86 transitions to step 90. At step 90, the controller 28 modifies the clock frequency of the processor device 22 and selects the more robust encoding mechanism 30 not associated with the current power state of power source 20. If the amount of energy is not enough to change encoding mechanisms 30 but can still save energy, the controller 28 may modify the clock frequency at which the processor device 22 operates but may not change the selected encoding mechanism 30 for step 84. Step 90 transitions to step 88 to encode and transmit data based on any adjustments made in step 90.

Figure 4:
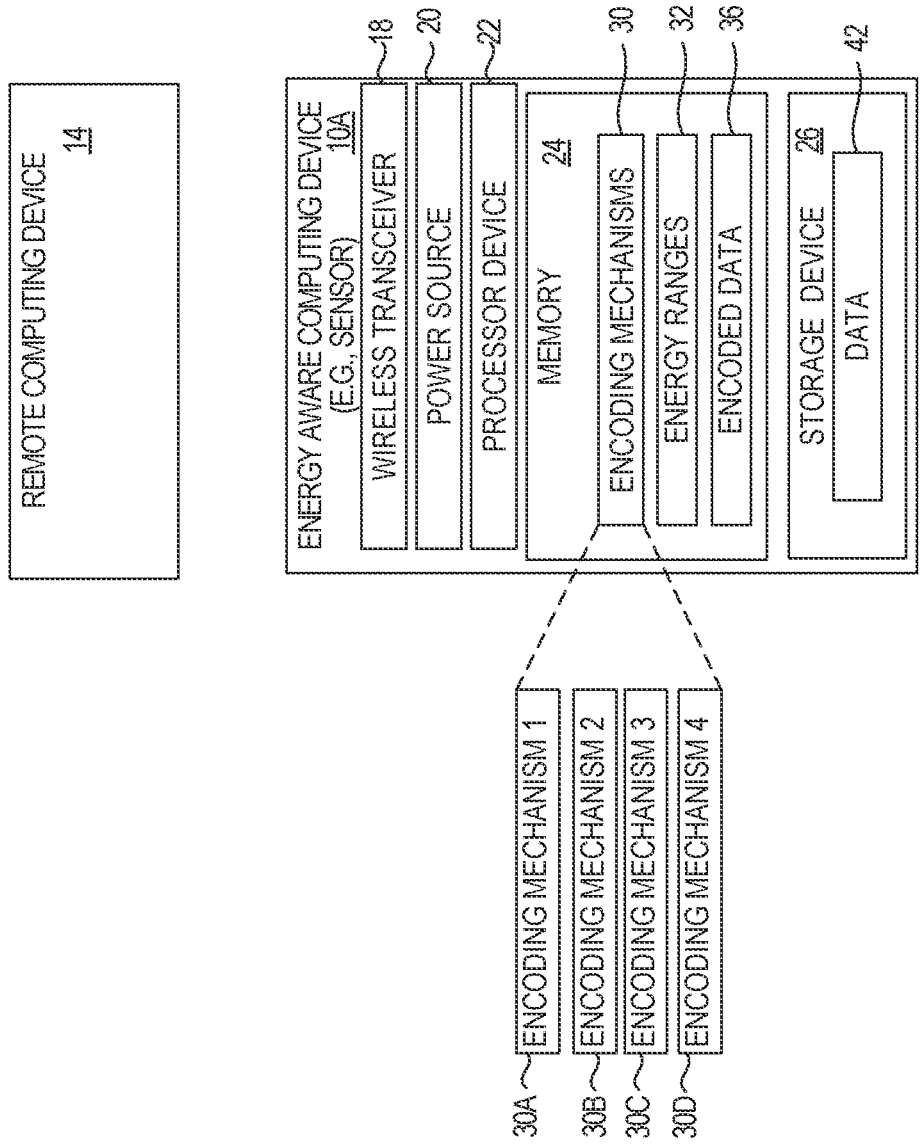
FIG. 4 is a simplified block diagram of the environment illustrated in FIG. 1 according to one example.

FIG. 4 is a simplified block diagram of the environment illustrated in FIG. 1 according to another implementation. The environment includes the energy aware computing device 10A, which in turn includes or is coupled to the power source 20, the wireless transceiver 18, the processor device 22, and the memory 24. The processor device 22 is coupled to the memory 24 to determine that the data 42 stored on the storage device 26 associated with the energy aware computing device 10A is to be transmitted to the remote computing device 14. The processor device 22 is further to determine the power state of the power source 20. The processor device 22 is to select an encoding mechanism 30 from the plurality of different encoding mechanisms 30A-30D based on the power state of the power source 20. The processor device 22 is to encode the data 42 based on the encoding mechanism 30 to generate the encoded data 36. The processor device 22 is to transmit, via the wireless transceiver 18, the encoded data 36 to the remote computing device 14.

Figure 5:
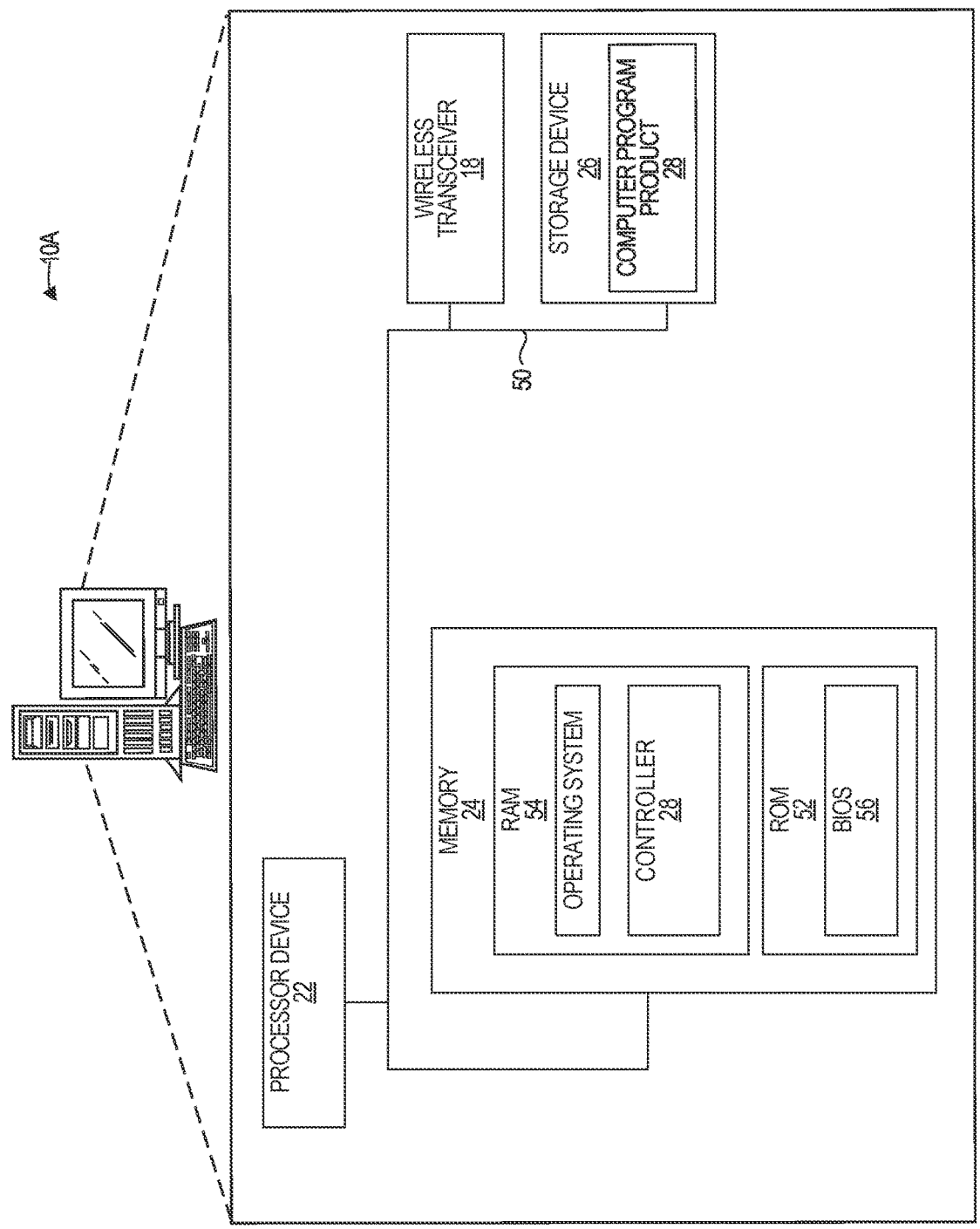
FIG. 5 is a block diagram of the computing device illustrated in FIG. 1 according to one example.

FIG. 5 is a block diagram of the energy aware computing device 10A suitable for implementing examples according to one example. The energy aware computing device 10A may comprise any computing or electronic device capable of including firmware, hardware, and/or executing software instructions to implement the functionality described herein, such as a computer server, a desktop computing device, a laptop computing device, a smartphone, a computing tablet, a sensor, a Raspberry Pi, or any other electronic device for which data replication is desired. The energy aware computing device 10A includes the processor device 22, the memory 24, and a system bus 50. The system bus 50 provides an interface for system components including, but not limited to, the memory 24 and the processor device 22. The processor device 22 can be any commercially available or proprietary processor.

The system bus 50 may be any of several types of bus structures that may further interconnect to a memory bus (with or without a memory controller), a peripheral bus, and/or a local bus using any of a variety of commercially available bus architectures. The memory 24 may include non-volatile memory 52 (e.g., read-only memory (ROM), erasable programmable read-only memory (EPROM), electrically erasable programmable read-only memory (EEPROM), etc.), and volatile memory 54 (e.g., random-access memory (RAM)). A basic input/output system (BIOS) 56 may be stored in the non-volatile memory 52 and can include the basic routines that help to transfer information between elements within the energy aware computing device 10A. The volatile memory 54 may also include a high-speed RAM, such as static RAM, for caching data.

The energy aware computing device 10A may further include or be coupled to a non-transitory computer-readable storage medium such as the storage device 26, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 26 and other drives associated with computer-readable media and computer-usable media may provide non-volatile storage of data, data structures, computer-executable instructions, and the like.

A number of modules can be stored in the storage device 26 and in the volatile memory 54, including an operating system and one or more program modules, such as the controller 28, which may implement the functionality described herein in whole or in part. All or a portion of the examples may be implemented as a computer program product 28 stored on a transitory or non-transitory computer-usable or computer-readable storage medium, such as the storage device 26, which includes complex programming instructions, such as complex computer-readable program code, to cause the processor device 22 to carry out the steps described herein. Thus, the computer-readable program code can comprise software instructions for implementing the functionality of the examples described herein when executed on the processor device 22. The processor device 22, in conjunction with the controller 28 in the volatile memory 54, may serve as a controller, or control system, for the energy aware computing device 10A that is to implement the functionality described herein. The energy aware computing device 10A may also include the wireless transceiver 18 suitable for communicating with the network 12 as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   determining, by a computing device comprising a processor device and powered by a power source, that data stored on a storage device associated with the computing device is to be transmitted to a remote computing device;
   determining, by the computing device, a power state of the power source;
   selecting, by the computing device, a first encoding mechanism from a plurality of different encoding mechanisms based on the power state of the power source, wherein the first encoding mechanism comprises a first compression technique and a first encryption technique, and wherein selecting the first encoding mechanism comprises:
      selecting the first compression technique from a plurality of compression techniques based on the power state of the power source; and
      selecting the first encryption technique from a plurality of encryption techniques based on the power state of the power source and the first compression technique;

encoding, by the computing device, the data based on the first encoding mechanism to generate encoded data; and transmitting, by the computing device to the remote computing device, the encoded data.

2. The method of claim 1 further comprising comparing the power state to a first energy range.

3. The method of claim 2, wherein selecting the first encoding mechanism further comprises:
determining that the power state is within the first energy range; and
in response to determining the that the power state is within the first energy range, selecting the first encoding mechanism, the first encoding mechanism requiring less energy consumption than a second encoding mechanism of the plurality of encoding mechanisms.

4. The method of claim 2, wherein selecting the first encoding mechanism further comprises:
determining that the power state is within the first energy range; and
in response to determining the that the power state is within the first energy range, selecting the first encoding mechanism, the first encoding mechanism requiring more energy consumption than a second encoding mechanism of the plurality of encoding mechanisms.

5. The method of claim 1 wherein determining that the data stored is to be transmitted further comprises receiving a request from the remote computing device to send the data.

6. The method of claim 1 wherein determining that the data stored is to be transmitted further comprises receiving a notification that a transmission timer has expired.

7. The method of claim 6 further comprising increasing the transmission timer to delay a frequency of transmission.

8. The method of claim 6 further comprising decreasing the transmission timer to increase a frequency of transmission.

9. The method of claim 1 wherein determining that the data stored is to be transmitted further comprises receiving a notification that an amount of data storage availability is less than a data capacity threshold.

10. The method of claim 1 wherein the power source is a battery.

11. The method of claim 10 further comprising:
comparing the power state to a first energy range;
measuring historical power consumption of the battery; and
redefining the first energy range based on the historical power consumption.

12. The method of claim 1 further comprising determining a strength of a cellular signal, wherein selecting the first encoding mechanism further comprises selecting the first encoding mechanism based on the strength of the cellular signal.

13. The method of claim 1 wherein the computing device is one of a mobile handset, an internet of things device, a computer laptop, or any other device that contains a processor device, storage, and a wireless transceiver.

14. The method of claim 1 wherein the data stored on the storage device is one of environmental data, multimedia data, and telemetry data.

15. The method of claim 1 wherein encoding the data based on the first encoding mechanism to generate the encoded data comprises:

compressing, by the computing device, the data based on the first compression technique to generate compressed data; and encrypting, by the computing device, the compressed data based on the first encryption technique to generate the encoded data.

16. A computing device, comprising:
a wireless transceiver;
a memory; and
a processor device coupled to the memory to:
determine that data stored on a storage device associated with the computing device is to be transmitted to a remote computing device;
determine a power state of a power source that powers the computing device;
select a first encoding mechanism from a plurality of different encoding mechanisms based on the power state of the power source, wherein the first encoding mechanism comprises a first compression technique and a first encryption technique, and wherein, to select the first encoding mechanism, the processor device is to:
select the first compression technique from a plurality of compression techniques based on the power state of the power source; and
select the first encryption technique from a plurality of encryption techniques based on the power state of the power source and the first compression technique;
encode the data based on the first encoding mechanism to generate encoded data; and
transmit, via the wireless transceiver, the encoded data to the remote computing device.

17. A non-transitory computer-readable storage medium that includes executable instructions to cause a processor device to:
determine that data stored on a storage device associated with a computing device is to be transmitted to a remote computing device;
determine a power state of a power source that powers the computing device;
select a first encoding mechanism from a plurality of different encoding mechanisms based on the power state of the power source, wherein the first encoding mechanism comprises a first compression technique and a first encryption technique, and wherein, to select the first encoding mechanism, the instructions further cause the processor device to:
select the first compression technique from a plurality of compression techniques based on the power state of the power source; and
select the first encryption technique from a plurality of encryption techniques based on the power state of the power source and the first compression technique;
encode the data based on the first encoding mechanism to generate encoded data; and
transmit the encoded data to the remote computing device.

\* \* \* \* \*